INVENTORS
ROBERT E. RUSKIN
BEN G. JULIAN
JULES M. AVERITT

INVENTORS
ROBERT E. RUSKIN
BEN G. JULIAN
JULES M. AVERITT

BY

ATTORNEY

United States Patent Office 3,498,108
Patented Mar. 3, 1970

3,498,108
CLOUD WATER EVAPORATOR
Robert E. Ruskin and Ben G. Julian, Accokeek, Md., and Jules M. Averitt, Washington, D.C., assignors to the United States of America as represented by the Secretary of the Navy
Filed July 31, 1967, Ser. No. 657,739
Int. Cl. G01n
U.S. Cl. 73—29                       12 Claims

ABSTRACT OF THE DISCLOSURE

A cloud water collector-evaporator apparatus having an elongated housing containing a high collection efficiency heater to vaporize liquid water and ice for subsequent determination of total cloud water content. Representative sampling is insured by connecting the collector to an airborne instrument unit having a source of reduced pressure.

---

The invention described herein may be manufactured and used by or for the Government of the United States of America for governmental purposes without the payment of any royalties thereon or therefor.

BACKGROUND OF THE INVENTION

Field of the invention

This invention relates to an apparatus for air borne sampling of clouds to increase knowledge of the dynamics and physics of clouds and to gain understanding of hurricane processes. The device is particularly useful in studying the effects of cloud seeding on the ice, liquid and vapor content of clouds.

The apparatus is designed to representatively sample or collect portions of a cloud mass, to evaporate all liquid water and ice contained therein, at a high rate during flight, and to permit measuring the water content of the cloud in terms of the resultant vapor leaving the collector-evaporator.

Description of the prior art

Conventional methods for studying the water content of clouds have measured the cooling effect of liquid water on heated wire or the change of electrical conductivity of chemically treated paper. Both these and other methods measure small quantities of liquid, but not ice, and require wind tunnel calibration.

Other devices have been suggested, for determining total water content, by passing cloud samples through hot tubes. Still others, exemplified by the patent to Booth, Patent No. 2,926,521, employ heated tubes to measure the liquid mass of aerosols. Such evaporative devices have not been satisfactory either due to "bumping" of water during heating or poor heater collection efficiency. Both factors prevent satisfactory contact of liquid and solids with hot tube walls causing incomplete evaporation. These devices are not readily adapted to air borne, high speed, collection and evaporation of cloud particles. Still other devices, such as disclosed by Weiss, Patent No. 3,011,336, collect cloud droplets to ascertain their size distribution but are incapable of providing a sample which allows continuous determination of total cloud water content during in flight sampling.

SUMMARY

The general purpose of this invention is to provide an apparatus for in flight collection and evaporation of cloud water and ice particles to permit subsequent determination of total water content in terms of the resultant vapor. Representative sampling of the cloud is insured by employing a reduced pressure source which insures isokinetic entry of sample at the collector inlet. Baffled heating means provide improved heater collection efficiency or contact of water and ice particles with heater surfaces. This allows substantially complete evaporation of all water and ice collected, particularly at relatively high air speeds. The novel features of the collector-evaporator provide a gaseous sample which is subsequently analyzed, giving almost instantaneous read-out and recording of the relative total cloud water content during flight.

It is therefore an object of the present invention to provide an apparatus for collecting and evaporating cloud samples with subsequent determination of total water content during flight.

Another object of this invention is to provide an apparatus having improved collection efficiency which more efficiently evaporates cloud liquid and particularly ice particles.

Still a further object of this invention is to provide an apparatus capable of collecting a representative sample of a cloud by providing essentially isokinetic sampling with a minimum air drag and disturbance to air flow around the collector entrance thereby preventing sorting or deflection of liquid, water and ice droplets.

Another object of this invention is to provide an apparatus which allows rapid evaporation of even large droplets in a small fraction of a second.

Other objects and many of the attendant advantages may be readily appreciated as the same comes better understood by reference to the following detailed description when considered in connection with the accompanying drawings wherein:

DESCRIPTION OF THE PREFERRED EMBODIMENT

Figure 1:
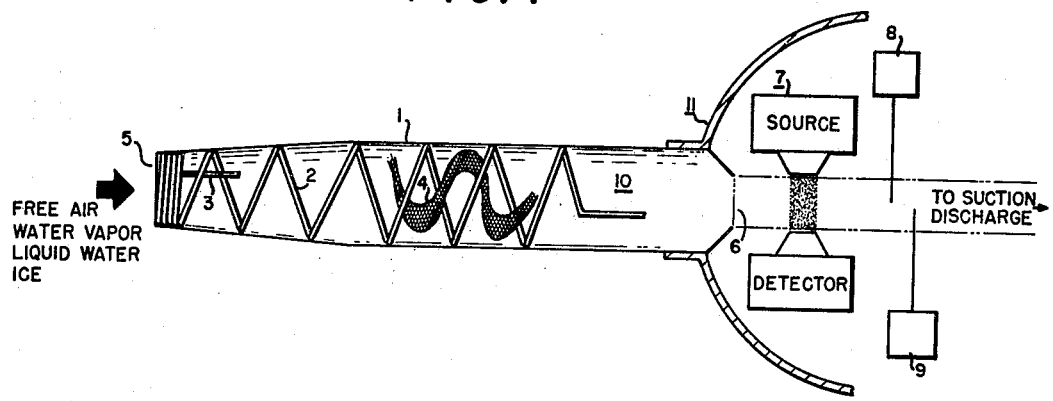
FIG. 1 is a longitudinal sectional view of one embodiment of this invention.

Referring now to the drawings, there is shown in FIG. 1 a collector-evaporator 10 having an elongated housing or duct 1, with an inlet opening 5 and outlet opening 6, affixed to an instrument carrying unit 11, only partially shown, having a reduced pressure source (not shown) in cooperative relationship with the inlet opening 5. Electrical heating means 2 and 3 (partially shown) are mounted longitudinally within said housing 1 and provide the heat necessary to vaporize cloud particles entering inlet 5. Impeding or baffle means 4 (partially shown) are operatively associated with heating means 2 and 3 and disposed longitudinally within the housing 1 to provide better contact between heaters 2 and 3 and cloud particles thus insuring substantially complete evaporation of water and ice within the housing 1. The housing 1 is removably attached to instrument containing unit 11 which contains a Lyman alpha spectral absorption water vapor density sensor unit 7 and a thermoelectric dewpoint hygrometer 8 connected in cooperable relationship to inlet 5 of the collector-evaporator housing 1. While any water vapor measuring instrument could replace either or both instruments 7 and 8, the above described instruments are preferred because of the rapid response time of sensor unit 7 and the highly accurate absolute data obtained from the hygrometer 8.

A suitable thermometer 9 is included in the instrument unit 11 so that vapor temperature may be measured. This allows heat balances to be made to determine the ice and liquid water content of the cloud.

Cloud particles drawn into the evaporator-collector 10 through opening 5 are evaporated in housing 1 and then pass to instruments 7 and 8 wherein the total water content of the gas is determined. The instrument carrying unit 11 is adapted to be fixed to any aircraft suitable for cloud studies. The forward end of housing 1 is conical, having an inlet orifice 5, of about 1 centimeter in diameter, by way of example, to receive the cloud sample. The aerodynamic characteristics of the probe are designed to provide a minimum pressure loss. The pressure at the entry 5 is maintained approximately equal to free stream static pressure by using a source of reduced pressure. This provides an essentially isokinetic entry of small and large particles of water and ice with a minimum modification of their natural size distribution upstream of the entry 5.

The heating element 2 and 3 may be silver soldered to the evaporator housing 1 at the entry 5 to prevent icing of the forward end of the probe. When soldered the area about the entry is generally machined to improve the aerodynamic characteristics of the probe.

The elongated evaporative housing 1 and instrument containing unit 11 may be of any metal conventionally used in aircraft. The heating means 2 and 3 are preferably insulated resistance wire chosen to provide sufficient wattage to evaporate all water and ice entering the probe when connected to a suitable current source aboard the aircraft. The resistance wire is preferably insulated for safety although uninsulated wire may be used if the probe 1 is manufactured from some electrically nonconductive material. Stainless steel clad, chromel-alumel thermocouple wire is a convenient commercial source of insulated resistance wire; the stainless cladding providing sufficient strength to maintain shape during cloud experimentation. Insulated Nichrome wire may also be used. A loose maze of fine screen 4 (partially shown) is intermixed with the heating elements 2 and 3 throughout the evaporator housing to provide maximum contact and evaporation of liquid and ice with low restriction to air flow. The baffle 4 may be prepared by spirally cutting a fine screen and then extending it along the longitudinal length of the heating element and inserting it among the coils of the heating units 2 and 3.

Figure 2:
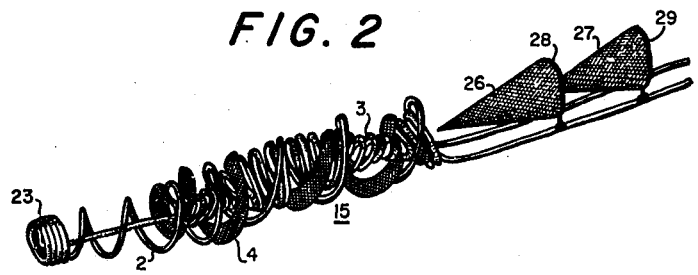
FIG. 2 illustrates a typical heater unit, having heating means and associated therewith particles impeding means, used in the apparatus of this invention.

FIG. 2 illustrates a preferred heater unit 15 employed by this invention. The heater unit 15 consists of a helically wound outer heater wire 2 and a substantially ellipsoidal inner heater wire 3 twisted along its longitudinal axis to both impede and heat collected ice and water particles. Wires 2 and 3 are formed from one continuous piece of stainless steel clad resistance wire. The individual windings of heater 3 are twisted along the longitudinal axis so as to reduce the free cross sectional area of the evaporator-collector. The windings of inner heater 3 may be made by helically winding the resistance wire and then applying pressure at points 180 degrees opposed so as to flatten the helix. The flattened windings are then twisted so that they assume the general shape shown in FIG. 2. The forward end 23 of heaters 2 and 3 are silver soldered and shaped to fit the collector-evaporator 10 of FIGURE 1.

Inserted between the windings of heaters 2 and 3 is shown a baffle 4 prepared from spirally cut wire screen which is extended along the heaters' longitudinal axes and inserted between individual windings. Additional conical shaped screens 26 and 27 are attached to the clad heaters 2 and 3 by clamps 28 and 29 at the outlet end of the heater to improve evaporator efficiency. Screens 4, 26 and 27 provide the impeding means causing more efficient contact of water and ice particles with the heaters 2 and 3 and provide additional heat transfer area for vaporizing water.

Figure 3:
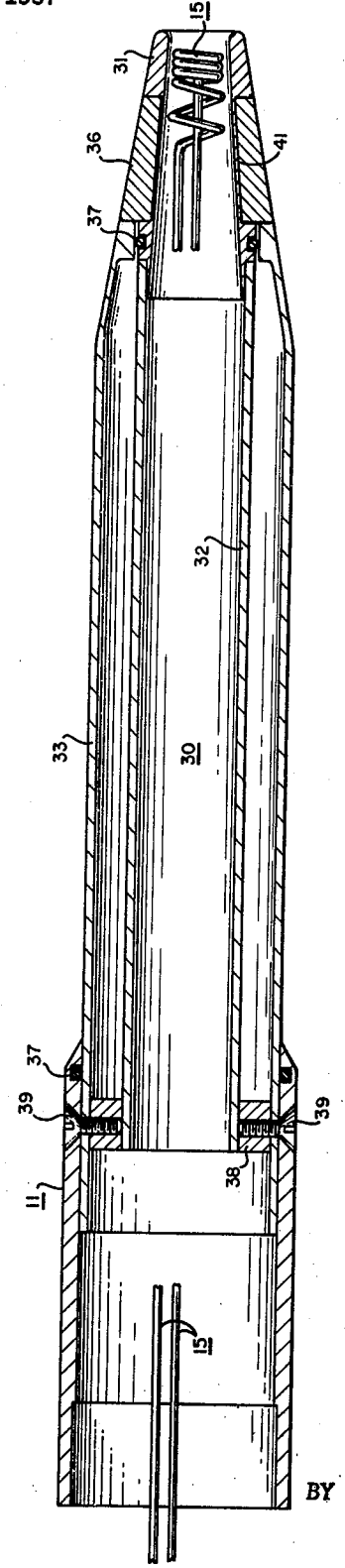
FIG. 3 is a sectional longitudinal view of preferred embodiment of the invention.

The heater unit 15 of FIG. 2 when inserted in the evaporator housing shown in FIG. 1 or FIG. 3 provides sufficient contact area and heat to almost completely evaporate all ice and water particles entering the collector-evaporator.

Complete evaporation is insured by the high collection efficiency of the baffled heater. Droplets of ice and water, traveling at high velocity in reference to the aircraft, impinge on the relatively small diameter wire of heaters 2 and 3 and even smaller diameter wires of the screen baffles 4, 26 and 27. Because of the small cross-sectional area of the heater and baffle wire, compared to the cross-sectional area of the collector-evaporator 10, the degree of cloud sample disturbance in the evaporator is minimized. By maintaining a high particle velocity the contact of particles with the heated wire is maximized, insuring almost complete evaporation of all particles.

While the heater unit shown by FIG. 2 is extremely efficient and represents the preferred embodiment of this invention it is recognized that other heat transfer units such as finned heat exchangers, employing waste engine exhaust heat, might be used if properly designed to provide high collection efficiency.

Referring now to FIG. 3 there is shown a preferred embodiment of the evaporator-collector probe of this invention. The cloud water collector-evaporator 30 has an inlet housing 31 to which is connected an elongated evaporation housing 32 enclosed in an elongated insulation housing 33 which is attached to the inlet housing toward the inlet end of the evaporation housing and is removably attached to the evaporation housing 32 near the outlet opening. Contained within the evaporation housing 32 and fixedly attached to the inlet housing 31 is the electrical resistance heater 15 described for FIG. 2. The inlet housing 31, is of hollow conical shape and is gradually tapered toward the outlet. The heater 15 is silver soldered to the inlet end of the inlet housing 31 to provide sufficient heat to prevent icing of the outer surface of the inlet housing. The inlet housing is provided with an indented area 41 which acts as a receptacle for plastic insulation 36 which may be epoxy or silicone rubber or other suitable equivalent. The portion of heater 15 silver soldered to the inlet housing 31 is suitably finished to provide a reasonably smooth inlet for collecting cloud samples without appreciable pressure drop.

The evaporation-housing 32 is shown removably attached to the inlet housing 31 at its outlet end. The attachment means may be simply a force fit, screwed fitting, bayonet fitting or other suitable equivalent which allow the inlet housing 31 with its attached heater 15 to be removed from the evaporation housing 32. The evaporation housing 32 is an elongated hollow cylinder having a diameter greater than the helical windings of the electric heater 15 and being of sufficient length to allow almost complete evaporation of liquid and ice within the evaporation housing.

An elongated insulation housing 33, to reduce heat loss, is shown encasing the evaporation housing 32. The insulation housing 33 is removably attached to the inlet housing 31. Any suitable attachment means such as those previously mentioned may be used. An "O" ring seal 37 is included to prevent leakage of air. The insulation housing is attached to the evaporator housing using spacers, two of which are shown as 38, and set screws, one of which is shown as 39, which maintain the evaporation housing 32 in spaced relationship to the insulation housing 33. The set screws 39 in addition to removably attaching the insulation housing 33 to the evaporation housing 32 also removably attach the insulation housing 33 to the instrument carrying unit partially shown as 11. The spacers 38 may be of glass or suitable metal or ceramic materials fixedly attached to the evaporation housing 32, if desired, by silver solder or suitable equivalent. Of course any attachment means may be employed that insure a spaced relationship between the evaporation housing 32 and the insulation housing 33 and removably fix the insulation housing 33 to the instrument unit 11.

The probe 30 is fabricated from stainless steel seamless tubing although any material suitable for airborne sampling could be employed.

Figure 4:
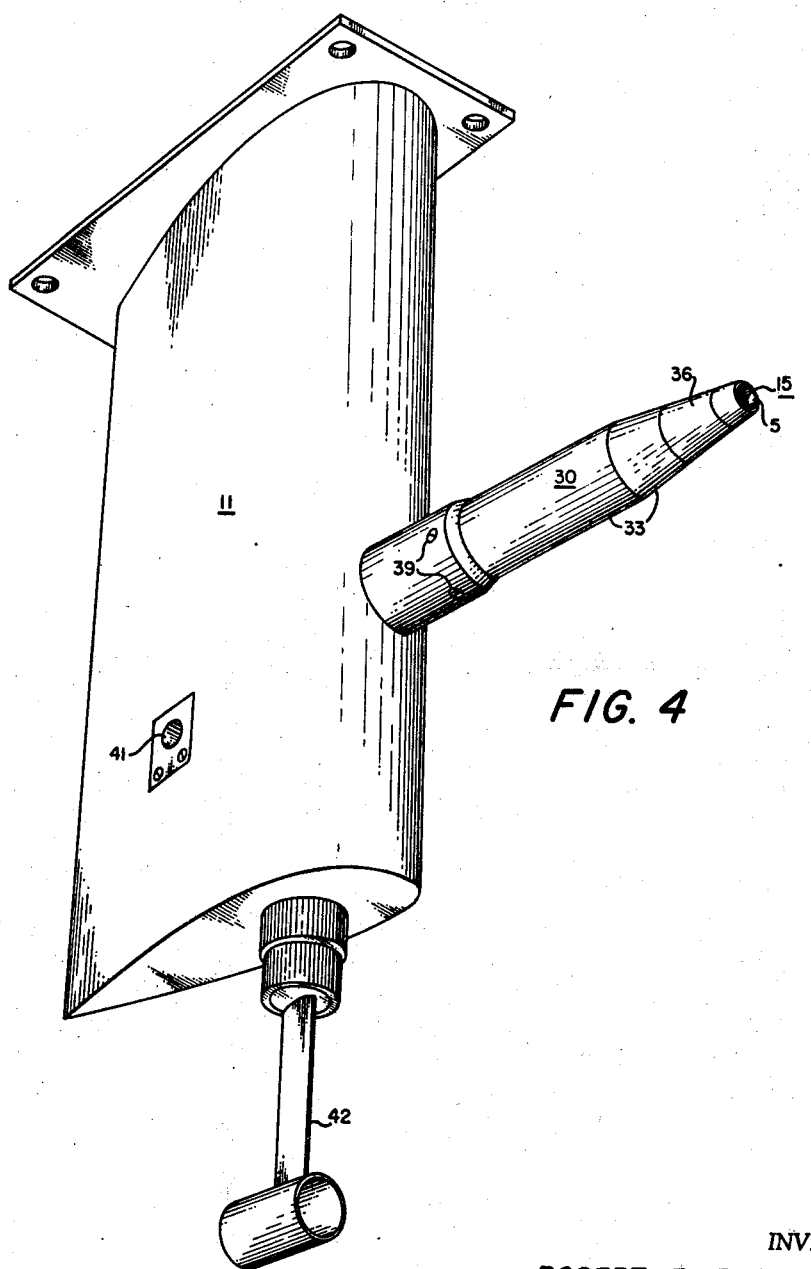
FIG. 4 is a perspective view of an air craft borne instrument carrying unit having attached thereto the cloud water collector-evaporator apparatus.

FIG. 4 is a perspective view of the evaporator-collector probe 30 attached to the instrument containing unit 11 as it would appear when assembled and attached to the aircraft used for sampling. The heater element 15 is partially shown at the inlet of the probe 30. An epoxy or silicone insulation ring 36 is shown with the insulation housing 33 starting at the insulation ring 36 and extending to the instrument unit housing 11. Screws 39 are shown which affix the evaporation probe 30 to the instrument unit 11. A source of reduced pressure is shown at 41 (the suction caused by the flow of air over the surface of the instrument unit) in communication with the inlet 5 of the collector-evaporator probe 30.

Other instruments such as the hot-wire instrument 42 for determining the liquid water content of clouds may be included in the instrument unit 11 to obtain further data useful in evaluating the proportion of ice, water and vapor present in a cloud.

The instrument unit 11 may be affixed to any suitable part of the aircraft such as a wing, a window of a plane or boom of a high speed aircraft.

The complete cloud water instrument consist of a water and ice collector-evaporator 30 coupled to an instrument unit 11 containing a calibrated, rapidly acting, water vapor density sensor and a dew-point hygrometer which gives an absolute, though more slowly responsive, determination of the total water content passing through the instrument.

As the aircraft passes through a cloud, ice and water particles are collected in the evaporator-collector which provides a minimum of air flow restriction and a maximum collection efficiency for droplets. The ice and water particles are evaporated in a loose maze of fine screens intermixed with heating elements which are distributed throughout the evaporator housing. The heating element is maintained somewhat below the boiling temperature of water in order to avoid "bumping" and to obtain maximum spreading of the water over the hot heated surfaces. Extremely fast and efficient evaporation, combined with the low restriction to the air flow, permits passage of a given parcel of air through the evaporator in about 0.01 second while providing about 98% to 99.5% or substantially complete evaporation.

The aerodynamic characteristics of the probe are such that the pressure in the entry 5 is maintained approximately equal to free stream static pressure by employing a reduced pressure source. This provides an essentially isokinetic entry of small and large particles of both water and ice with a minimum of modification of their natural size distribution. A one centimeter entry orifice insures a sufficiently large sample volume to approach being statistically representative of the cloud. Smaller orifice may be used but some sacrifice in collection efficiency occurs. Larger orifices may be used if desired but would require more heater windings to provide sufficient heat for total evaporation.

After passing through the evaporator, the evaporated cloud sample passes through the beam of a glow discharge tube producing the Lyman-alpha line in the hydrogen ultraviolet at 1215.6 Angstroms. Measurements of the absorption of the Lyman-alpha radiation by instrument 7 provides a record of the water vapor density which is representive of the total water content of the cloud.

A thermoelectric dew-point hygrometer 8 is preferably used in conjunction with the Lyman-alpha device 7 to give an absolute value for water content since Lyman-alpha measurement is affected by the sample air density, which varies with altitude pressure and sample temperature. In order to rapidly determine the absolute vapor density, the spectral absorption detector is calibrated, during clear air portions of flight, in terms of dew-point as recorded by the thermoelectrically cooled, automatic, dew-point hygrometer.

Where the proportion of ice and water particles is to be determined rather than the total water content of the cloud, a heat balance can be employed by measuring the cooling effect of ice and water particles on the vapor passing through the collector compared to clear air flight vapor temperature.

The apparatus of this invention insures uniform and representative sampling of clouds from aircraft. High collection efficiency of the baffled heater gives substantially complete evaporation of all ice and water particles collected within a small fraction of a second. The resulting gaseous sample, subsequently analyzed by suitable dew-point devices provides, for the first time, a continuous record of the total moisture content of clouds.

Obviously many modifications and variations of the present invention are possible in the light of the above teachings. It is therefore to be understood the invention may be practiced otherwise than as specifically described.

What is claimed and desired to be secured by Letters Patent of the United States is:

1. A cloud-water collector and evaporator for use in conjunction with an aircraft borne instrument carrying unti having a reduced pressure source and water vapor measurement instruments comprising:
   an elongated housing having inlet and outlet openings and being adapted to have its outlet opening connected to said instrument unit for cooperable relationship with said reduced pressure source;
   heating means mounted longitudinally within said housing;
   said inlet opening being operable when said housing is borne aloft on the aircraft to receive liquid and ice in the atmosphere for passage therethrough; and
   baffle means mounted within said housing and being operatively associated with said heating means to imepede said liquid and ice so as to enable said heating element to evaporate the liquid and ice to provide a gaseous sample, said baffle means including a portion thereof which is mounted longitudinally within said housing and being coextensive with said heater means,
   whereby the water content of said sample is measured by said water-vapor measuring instruments.

2. The invention of claim 1 in which said heater means is a coiled resistance wire.

3. The invention of claim 2 in which said baffles means is perforated.

4. The invention of claim 3 in which said baffle means includes at least one baffle spirally cut from a wire screen and longitudinally mounted within said housing in a substantially tapered helical configuration.

5. The invention of claim 4 in which said baffle means includes at least one conically shaped perforated baffle is mounted longitudinally within and toward the outlet end of said housing.

6. The invention of claim 5 in which said heating means is fixably attached to the inlet opening of said elongated housing whereby icing of the collector inlet area is prevented.

7. The invention of claim 6 in which said elongated housing is insulated to reduce loss of heat generated by the heating means.

8. A cloud-water collector-evaporator for use in conjunction with an aircraft borne instrument carrying unit having a reduced pressure souce and water vapor measuring instruments to measure the water content of cloud ice, liquid and vapor comprising:
   an inlet housing;
   an elongated evaporation housing removably attached to said inlet housing having inlet and outlet openings, said evaporation housing being adapted to have an outlet opening connected to said instrument unit for cooperable relationship with said reduced pressure source;

heating means mounted longitudinally within said evaporation housing and fixably attached to said inlet housing;

impeding means disposed within said evaporation housing and operatively associated with said heating means to evaporate said liquid and ice to provide a gaseous sample; said impeding means having at least a portion thereof mounted longitudinally within said housing and being substantially coextensive with said heating means; and an elongated insulation housing encasing said evaporation housing and removably attached to said inlet housing toward the inlet end of the evaporation housing and removably attached to the evaporation housing near the outlet opening, said insulation housing being adapted for removable attachment to said instrument carrying unit.

9. The invention of claim 8 in which said heating means is an electrical resistance wire coiled in the form of a helix near the walls of the evaporation housing and wound back through the helix in a substantially ellipsoidal winding having individual windings twisted about the longitudinal axis to improve ice and water impingement on the heating element surfaces.

10. The invention of claim 9 in which said impeding means comprise a spirally cut screen extended longitudinally within said evaporation housing and inserted between individual windings of said heating means to further impede ice and water particles.

11. The invention of claim 10 in which said impeding means include at least one screen placed within and toward the outlet of said evaporation housing and clamped to the electrical heating means.

12. The invention of claim 8 further including an instrument unit, adapted to be connected to an aircraft, having a source of reduced pressure and containing at least one instrument capable of determining the mass of water present in a unit volume of gas.

References Cited

UNITED STATES PATENTS

| | | | |
|---|---|---|---|
| 2,915,898 | 12/1959 | Van Luik | 73—29 |
| 2,926,521 | 3/1960 | Booth | 73—29 |
| 2,982,131 | 5/1961 | Rosinski | 73—421.5 |
| 3,011,336 | 12/1961 | Weiss | 73—29 |
| 3,388,596 | 6/1968 | Foley | 73—336.5 |
| 2,786,354 | 3/1957 | Martin et al. | 73—204 |

CHARLES A. RUEHL, Primary Examiner

U.S. Cl. X.R.

73—336.5